(12) United States Patent
Weibl

(10) Patent No.: US 7,658,578 B1
(45) Date of Patent: Feb. 9, 2010

(54) TARP LASHING SYSTEM

(76) Inventor: Jeffery A. Weibl, P.O. Box 413, South Prairie, WA (US) 98385

( * ) Notice: Subject to any disclaimer, the term of this patent is extended or adjusted under 35 U.S.C. 154(b) by 513 days.

(21) Appl. No.: 11/712,013

(22) Filed: Feb. 28, 2007

(51) Int. Cl.
*B60P 7/08* (2006.01)

(52) U.S. Cl. .................. 410/97; 410/118; 296/100.16

(58) Field of Classification Search .............. 410/97, 410/100, 116, 118; 150/166; 296/100.01, 296/100.15, 100.16; 160/400, 402–404; 52/3
See application file for complete search history.

(56) References Cited

U.S. PATENT DOCUMENTS

| | | |
|---|---|---|
| 2,705,461 A | 4/1955 | Campbell |
| 2,807,499 A | 9/1957 | Duddleston |
| 4,691,957 A | 9/1987 | Ellingson |
| 4,900,204 A | 2/1990 | Summers |
| 4,979,776 A | 12/1990 | Schweickert |
| 5,050,924 A | 9/1991 | Hansen |
| 5,168,605 A | 12/1992 | Bartlett |
| 5,416,956 A | 5/1995 | Rubin |
| 5,743,700 A | 4/1998 | Wood, Jr. et al. |
| 5,924,758 A | 7/1999 | Dimmer et al. |
| 6,017,174 A * | 1/2000 | Ross et al. .................. 410/100 |
| 6,152,664 A | 11/2000 | Dew et al. |
| 6,168,360 B1 | 1/2001 | Knox |
| 6,224,139 B1 | 5/2001 | Weyand |
| 6,292,987 B1 | 9/2001 | Combes |
| 6,347,826 B1 | 2/2002 | Horner et al. |
| 6,783,312 B2 | 8/2004 | Smith |

\* cited by examiner

*Primary Examiner*—Stephen Gordon
(74) *Attorney, Agent, or Firm*—bobharter.com; Robert J. Harter

(57) ABSTRACT

A tarp lashing system for an open bed trailer employs a novel hook that eliminates the need for threading an elastic cord through a series of D-rings on the tarp. The novel hook is used in conjunction with the anchor points that already exist on the perimeter of the trailer. In some embodiments, the hooks have a clamped state and an unclamped state. In the clamped state, the hook grips the cord to maintain the hook's position along the cord's length. In the unclamped state, the hook's position can be readily adjusted by sliding the hook along the length of the cord. With this system, the hooks can be selectively hooked onto one of multiple series of D-rings so that the tarp can be adjusted to match the size of the load.

9 Claims, 3 Drawing Sheets

FIG. 4    FIG. 5        FIG. 6    FIG. 7
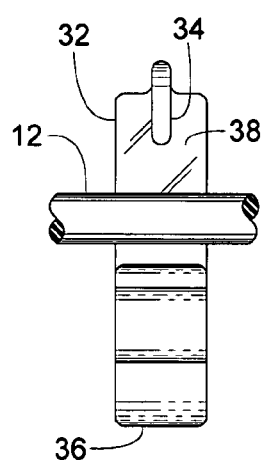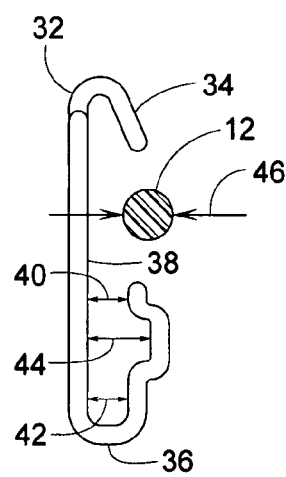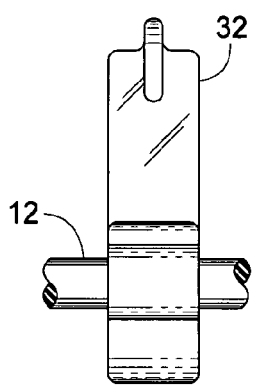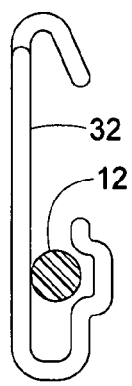
FIG. 8    FIG. 9
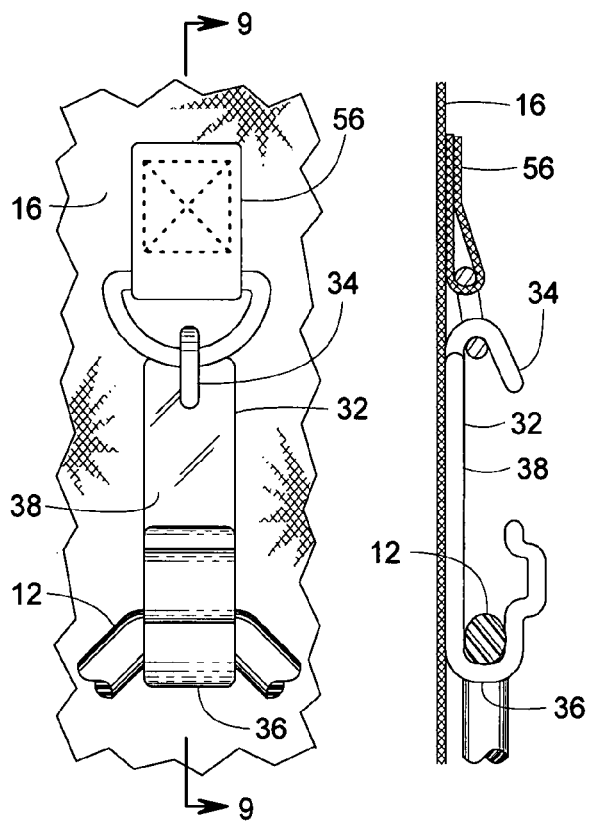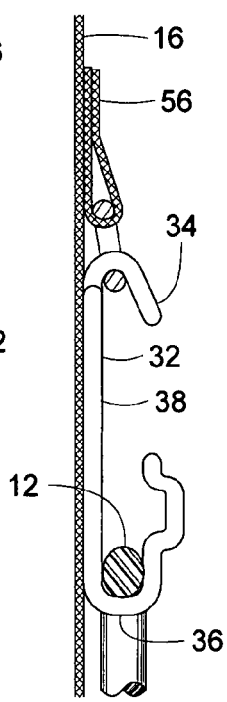
FIG. 10    FIG. 11
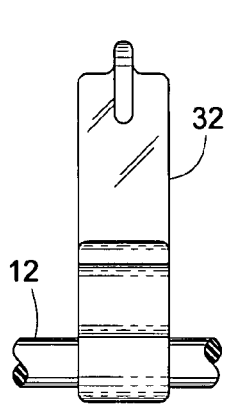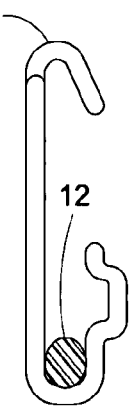

TARP LASHING SYSTEM

BACKGROUND OF THE INVENTION

1. Field of the Invention

The subject invention generally pertains to lashing tarpaulins and more specifically to a system particularly suited for lashing a tarpaulin over an open bed truck trailer.

2. Description of Related Art

A tractor/trailer rig comprising a truck (also known as a tractor) pulling an open bed trailer is often used for hauling cargo over-the-road. To protect the cargo, a tarpaulin (also known as a tarp) is laid over the load, and an elastic cord is used for securing the tarp to the trailer. The cord is usually laced between a series of D-rings on the tarp and a series of hooks or anchors on the trailer's perimeter (also known as a rub/tie rail).

It can be quite time consuming to sequentially thread the cord through each individual D-ring, it can be challenging to adjust the length of the cord to suit the size of the load, and it can be unpleasant to lash a load under adverse weather conditions. Although a variety of lashing methods have been developed, they all have their drawbacks.

U.S. Pat. No. 6,783,312, for instance, provides a creative way of anchoring a cord to an open bed trailer, but the cord still needs to be sequentially threaded through individual D-rings.

U.S. Pat. No. 4,900,204 discloses a hook that couples an open net to a truck that does not have its own hooks or anchors. But, conventional open bed trailers already have hook-like anchors, so there is no need for the '204 hook in such applications. Note, the '204 hook (item 31, FIG. 4 of the '204 patent) is not used for vehicles that have their own pre-existing anchors (see FIGS. 1, 2, 5 and 6 of the '204 patent). Moreover, the anchors of conventional open bed trailers are designed to hold a cord, not another hook. A cord can be readily slipped over the end of today's anchors, but the hook of the '204 patent just adds a redundant part to an already functional lashing system.

Although numerous other lashing systems disclose various types of hooks, none of the systems address the time-consuming problem of having to thread a cord through a series of D-rings or apertures on the tarp and then having to lash that cord to pre-existing anchors on a conventional open bed trailer.

SUMMARY OF THE INVENTION

To provide an improved tarp lashing system for an open bed trailer having its own cord anchors, an object of the invention is to eliminate the need for threading the cord through a series of individual apertures or D-rings on the tarp.

Another object of some embodiments is to enable a user to quickly adjust the lashing system to loads of various sizes.

Another object of some embodiments is to provide a hook that minimizes wear against a tarp.

Another object of some embodiments is to provide a hook that can be selectively manipulated to a clamped state where the hook grips the cord and an unclamped state where the hook can readily slide along the cord's length.

Another object of some embodiments is to provide a hook selectively having a clamped state and an unclamped, yet the hook is a unitary piece with no moving parts.

Another object of some embodiments is to provide a hook that remains spaced apart from the trailer's anchors so that the anchors are available for their intended purpose of holding an elastic cord.

Another object of some embodiments is to join the opposite ends of an elastic cord to create a continuous loop that when used in conjunction with a tarp having at least two series of apertures, the continuous loop can be left intact for loads of various sizes.

Another object of some embodiment is to maintain a cord in a spaced apart relationship with a series of D-rings or apertures on a tarp so that the cord does not have to be threaded through the D-rings or apertures.

One or more of these and/or other objects of the invention are provided by a tarp lashing system that employs hooks in addition to the existing anchors on a conventional open bed trailer to eliminate the need for threading an elastic cord through a series of individual D-rings or apertures in the tarp.

BRIEF DESCRIPTION OF THE DRAWING

FIG. 4 is a front view of a hook where the cord is disengaged from the hook.

FIG. 5 is an end view of FIG. 4.

FIG. 6 is a front view similar to FIG. 4 but showing the cord inserted in the hook and the hook in its unclamped state.

FIG. 7 is an end view of FIG. 6.

FIG. 8 is a front view of the hook engaging the cord and a D-ring of the tarp, wherein the hook is in its clamped position.

FIG. 9 is a cross-sectional end view taken along line 9-9 of FIG. 8.

FIG. 10 is a front view similar to FIGS. 4 and 6 but showing the hook in a clamped state.

FIG. 11 is an end view of FIG. 10.

DESCRIPTION OF THE PREFERRED EMBODIMENT

Figure 1:
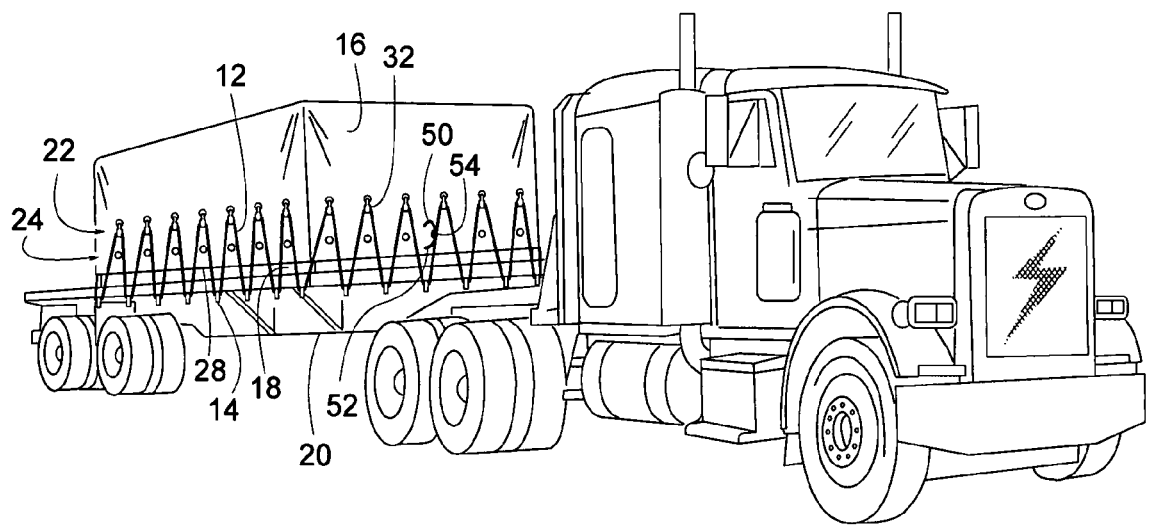
FIG. 1 is a perspective view of a tractor/trailer rig employing a novel tarp lashing system.
Figure 2:
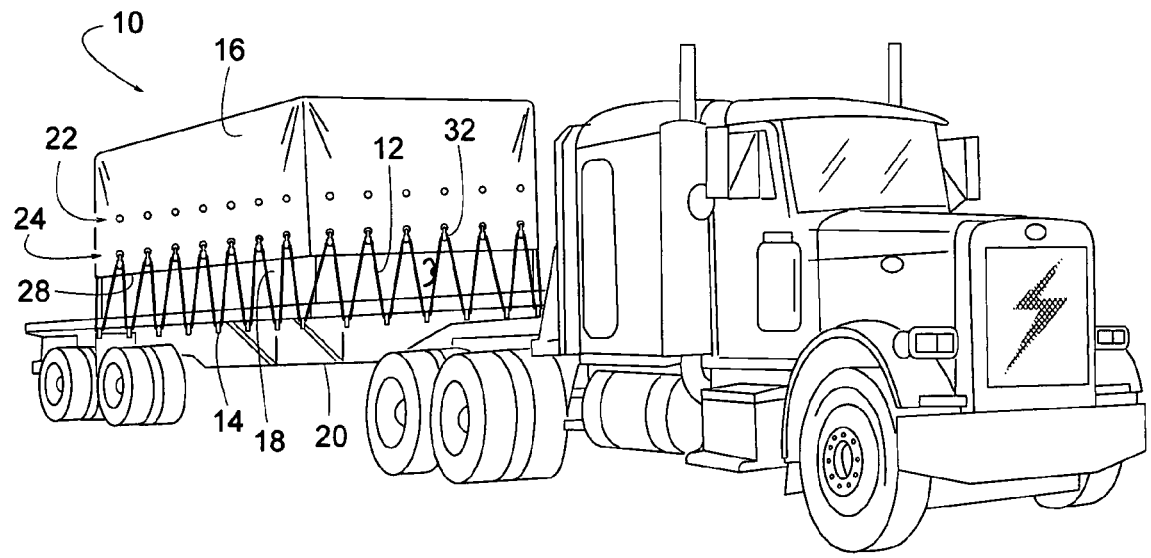
FIG. 2 is a perspective view similar to FIG. 1 but with the tarp lashing system covering a larger load.
Figure 3:
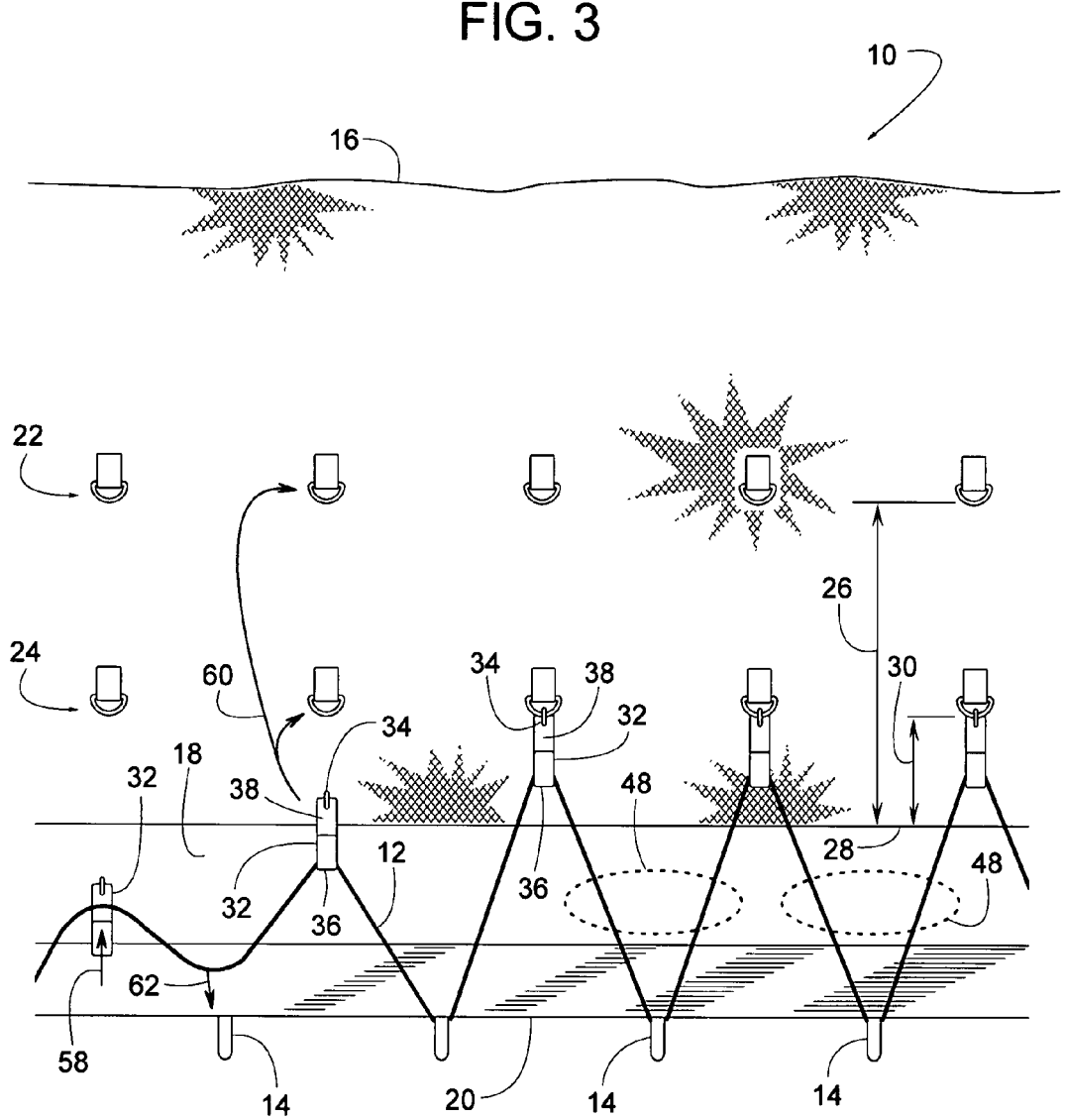
FIG. 3 is a partial side view of the trailer showing the tarp lashing system.

A lashing system 10 shown in FIGS. 1-3 comprises an elastic cord 12 that is lashed in a zigzag pattern between a plurality of anchors 14 and a series of apertures (e.g., D-rings, grommets, etc.) on a tarp 16 that covers a load 18 carried by an open bed trailer 20. Tarp 16 is a pliable sheet of material that shelters load 18 from weather. The apertures can be a first set of apertures 22 for low loads, as shown in FIG. 1, or a second set of apertures 24 for higher loads, as shown in FIG. 2. Referring to FIG. 3, apertures 22 are at a first distance 26 away from an outer perimeter 28 of tarp 16, and apertures 24 are at a second distance 30 away from perimeter 28. A plurality of hooks 32 couple cord 12 to apertures 22 or 24 so that cord 12 does not have to be threaded through the apertures or even engage them.

The structure and use of anchors 14 are well known to those of ordinary skill in the art. Anchors 14 can be fixed protrusions that extend from trailer 20 so that cord 12 can be secured by simply looping cord 12 behind or underneath anchors 14. Alternatively, anchors 14 may include rollers or spools for taking up excess slack of cord 12. Such rollers could be selectively rotated individually or in unison.

To couple an upper end of cord 12 to apertures 22 or 24, hook 32 comprises an aperture-engaging end 34 for hooking into apertures 22 or 24, a cord-engaging end 36 for engaging cord 12, and a shank 38 extending between ends 34 and 36. Shank 38 is preferably wider than aperture-engaging end 34 to help minimize hook 32 chafing against tarp 16. Hook 32 can be made of any suitable material including, but not limited to, aluminum, steel, stainless steel, plastic, brass, bronze, and various alloys and combinations thereof. Further details of one embodiment of hook 32 are more clearly shown in FIGS. 4-11.

Referring to FIGS. 4 and 5, hook 32 defines a throat 40, a narrow receptacle 42 and a wide receptacle 44. The terms, "narrow receptacle" and "wide receptacle" simply identify their sizes relative to each other and are not meant to represent any particular limiting dimension. When cord 12 is unstressed by any portion of hook 32, cord 12 has a relaxed diameter 46 that is greater than throat 40, greater than narrow receptacle 42, and less than wide receptacle 44. This allows cord 12 to be compressibly squeezed through throat 40 from the cord's disengaged position of FIGS. 4 and 5 to its captured position of FIGS. 6 and 7. With cord 12 in the position of FIGS. 6 and 7, hook 32 is in its unclamped state where hook 32 can be readily slid along the length of cord 12 because of the clearance between cord 12 and wide receptacle 44, yet hook 32 will not readily fall off of cord 12 because of the interference fit between cord 12 and throat 40.

Cord 12 can be compressibly forced into narrow receptacle 42, as shown in FIGS. 8-11, so that cord 12 becomes pinched within narrow receptacle 42 because of the interference fit between cord 12 and narrow receptacle 42. When cord 12 is compressed within narrow receptacle 42, hook 32 is in its clamped state so that the hook's position along the length of cord 12 is held substantially fixed. Referring to FIG. 3, hooks 32 being hooked onto cord 12 define a plurality of cord segments 48, which in turn can be stretched and hooked onto anchors 14.

The clamped state (FIGS. 10 & 11) helps keep hooks 32 in generally desirable positions along cord 12 even when cord 12 is removed from tarp 16 and stowed. And, the unclamped state (FIGS. 6 & 7) allows the positions of hooks 32 to be easily adjusted along the length of cord 12 when necessary. When cord 12 is held in tension, as shown in FIGS. 1 and 2, the tension naturally urges cord 12 into narrow receptacle 42, as shown in FIGS. 8 and 9.

Cord 12 has two ends 50 and 52 (FIG. 1) that are preferably tied or otherwise connected to create a continuous loop of cord 12. The continuous loop helps secure tarp 12 around its entire perimeter. The position of a knot 54 or other connection along the length of cord 12 determines the amount of surplus cord for providing a suitable average overall tension in cord 12.

Referring to FIGS. 8 and 9, when apertures 24 are D-rings, tabs 56 can be used to attach the D-rings to tarp 16.

In some embodiments, cord 12 is made of neoprene or a neoprene-like material with a relaxed diameter of 0.375" (nominal dimension)

Referring to FIG. 3, arrow 58 represents the step of installing a plurality of hooks 32 on elastic cord 12, wherein the plurality of hooks 32 on elastic cord 12 define the plurality of cord segments 48 therebetween. Arrows 60 represent the step of hooking the plurality of hooks 32 selectively through one of the first set of apertures 22 and the second set of apertures 24. Arrow 62 represents the step of hooking the plurality of cord segments 48 onto the plurality of anchors 14 such that cord 12 directly engages the plurality of anchors 14, and cord 12 zigzags between the plurality of anchors 14 on open bed trailer 20 and the plurality of hooks 32. Arrow 62, but pointing in an opposite direction, represents the step of eventually releasing tarp 16 from open bed trailer 20 by separating elastic cord 12 from the plurality of anchors 14.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A tarp lashing system comprising:
    an open bed trailer;
    a plurality of anchors disposed on the open bed trailer;
    a tarp that includes a first set of apertures, a second set of apertures, and an outer perimeter; the first set of apertures are at a first distance from the outer perimeter, and the second set of apertures are at a second distance from the outer perimeter;
    an elastic cord engaging the plurality of anchors; and
    a plurality of hooks each comprising an aperture-engaging end engaging at least one of the first set of apertures and the second set of apertures, a cord-engaging end engaging the elastic cord, and a shank extending between the aperture-engaging end and the cord-engaging end, the tarp lashing system is such that:
        a) the elastic cord zigzags between the plurality of hooks and the plurality of anchors,
        b) the elastic cord is spaced apart from the first set of apertures and the second set of apertures, and
        c) the plurality of hooks are spaced apart from the plurality of anchors on the open bed trailer.

2. The tarp lashing system of claim 1, wherein the shank is wider than the aperture-engaging end.

3. The tarp lashing system of claim 1, wherein the elastic cord includes two opposite ends that are coupled to each other to create a continuous loop of the elastic cord.

4. The tarp lashing system of claim 1, wherein the plurality of hooks includes a hook that is selectively configurable to a clamped state and an unclamped state relative to the elastic cord such that if the elastic cord is disengaged from the plurality of anchors:
    a) the hook in the clamped state grips the elastic cord to resist relative sliding motion between the hook and the elastic cord, and
    b) the hook in the unclamped state can freely slide along a length of the elastic cord.

5. The tarp lashing system of claim 4, wherein the hook is a unitary piece.

6. The tarp lashing system of claim 4, wherein the hook defines a narrow receptacle, a wide receptacle, and a throat; the elastic cord has a relaxed diameter that is wider than the throat and the narrow receptacle but is narrower than the wide receptacle.

7. A tarp lashing system comprising:
    an open bed trailer;
    a plurality of anchors disposed on the open bed trailer;
    a tarp that includes a first set of apertures, a second set of apertures, and an outer perimeter; the first set of apertures are at a first distance from the outer perimeter, and the second set of apertures are at a second distance from the outer perimeter;
    an elastic cord engaging the plurality of anchors; and
    a plurality of hooks each comprising an aperture-engaging end engaging at least one of the first set of apertures and the second set of apertures, a cord-engaging end engaging the elastic cord, and a shank extending between the aperture-engaging end and the cord-engaging end, the tarp lashing system is such that:
        d) the elastic cord zigzags between the plurality of hooks and the plurality of anchors;
        e) the elastic cord is spaced apart from the first set of apertures and the second set of apertures;

f) the plurality of hooks are spaced apart from the plurality of anchors on the open bed trailer;

g) the shank is wider than the aperture-engaging end;

h) the plurality of hooks includes a hook that is selectively configurable to a clamped state and an unclamped state relative to the elastic cord such that if the elastic cord is disengaged from the plurality of anchors, the hook in the clamped state grips the elastic cord to resist relative sliding motion between the hook and the elastic cord, and if the elastic cord is disengaged from the plurality of anchors, the hook in the unclamped state can freely slide along a length of the elastic cord; and i) the hook defines a narrow receptacle, a wide receptacle, and a throat, and the elastic cord has a relaxed diameter that is wider than the throat, wider than the narrow receptacle, and narrower than the wide receptacle.

8. The tarp lashing system of claim 7, wherein the elastic cord includes two opposite ends that are coupled to each other to create a continuous loop of the elastic cord.

9. The tarp lashing system of claim 7, wherein the hook is a unitary piece.

\* \* \* \* \*